United States Patent [19]

Yanagi

[11] Patent Number: 4,542,428
[45] Date of Patent: Sep. 17, 1985

[54] DISK FOR MEASURING OFF-TRACK QUANTITY OF MAGNETIC HEAD, AND MEASURING APPARATUS USING THE DISK

[75] Inventor: Masahiro Yanagi, Settsu, Japan

[73] Assignee: Matsushita Electric Industrial Co., Ltd., Kadoma, Japan

[21] Appl. No.: 536,459

[22] Filed: Sep. 28, 1983

[30] Foreign Application Priority Data

Oct. 1, 1982 [JP] Japan ................................ 57-173541
Dec. 9, 1982 [JP] Japan ................................ 57-216602

[51] Int. Cl.$^4$ .......................... G11B 5/58; G11B 23/36
[52] U.S. Cl. ........................................ 360/75; 360/77; 360/135
[58] Field of Search ............................ 360/75, 77, 135

[56] References Cited

U.S. PATENT DOCUMENTS 4,084,201  4/1978  Hack et al. ........................... 360/135

Primary Examiner—George G. Stellar
Attorney, Agent, or Firm—Wenderoth, Lind & Ponack

[57] ABSTRACT

Burst-like data are alternately recorded on a disk over one round of tracks in directions of inner and outer circumferences with a track center of a desired track as a border. The burst-like data are arranged in such a manner that each data length of burst-like data is made shorter than a distance between a read.write gap of a magnetic head for reproducing the data and an erase gap, and that the distance among data of the burst-like data is made longer than a distance between the read.write gap and the erase gap. An apparatus for measuring the off-track of the magnetic head using the disk includes AC-DC converter to which reproducing signals of the magnetic head are supplied, reproduced DC signals being obtained from the AC-DC converter, A/D converter for converting the DC signals to obtain digital data, a timing generator for detecting the burst-like data and generating timing signals of data collection, an amplitude ratio calculation circuit for performing discrimination of the burst-like data provided at an inner or outer circumference side of the track and for detecting an amplitude ratio, and an amplitude ratio vs off-track quantity conversion circuit for converting the amplitude ratio to the off-track quantity of the magnetic head.

4 Claims, 24 Drawing Figures

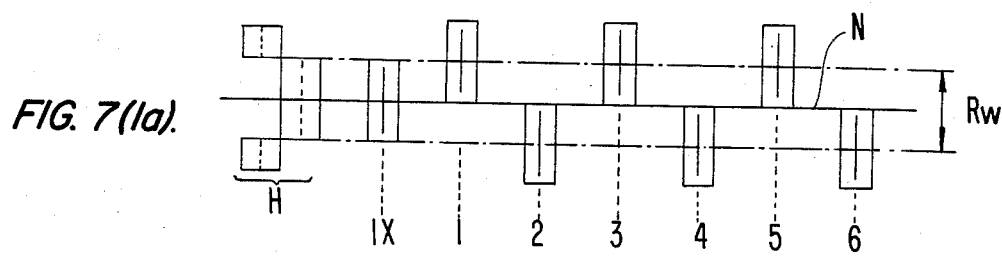
FIG. 7(1a).
FIG. 7(1b).
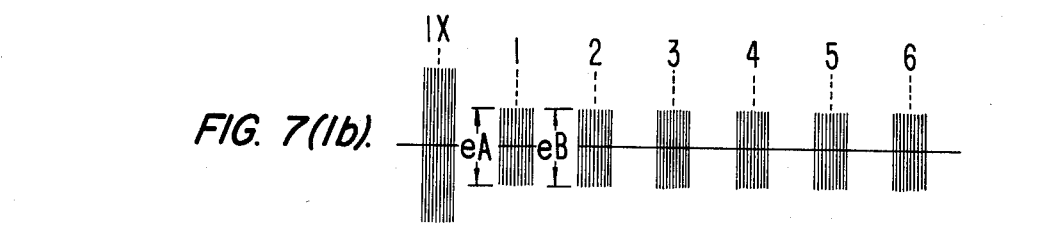
FIG. 7(2a).
FIG. 7(2b).
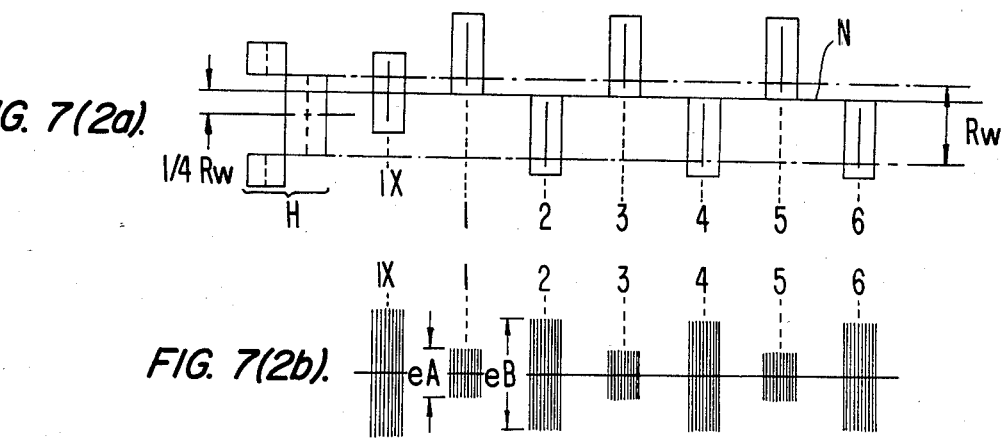
FIG. 8(a).    FIG. 8(b).
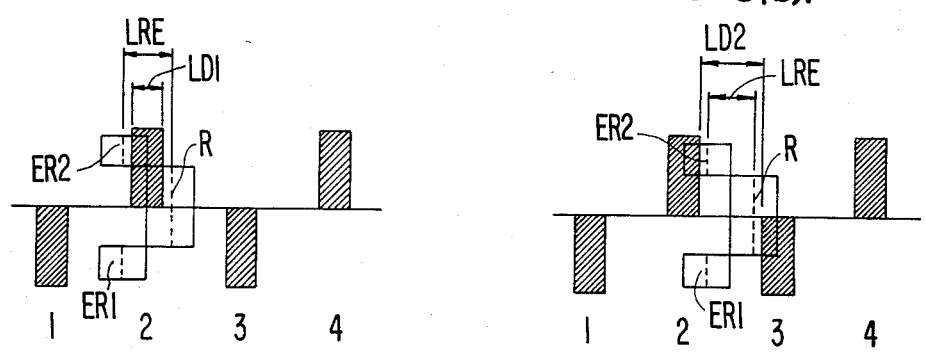
FIG. 8(c).

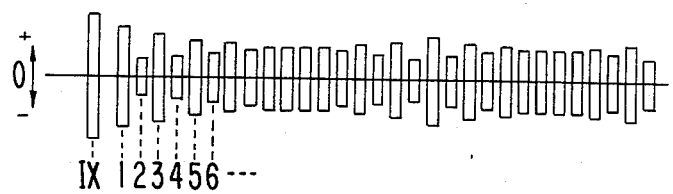
FIG. 10(a).
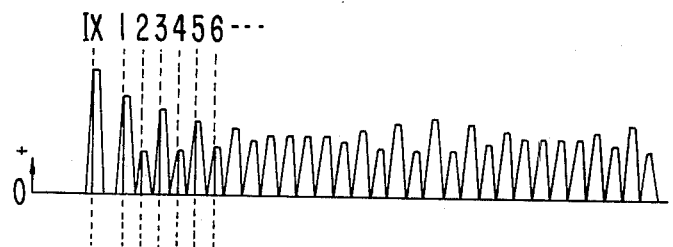
FIG. 10(b).
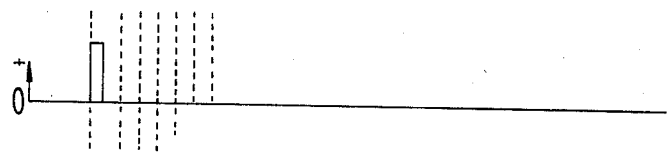
FIG. 10(c).
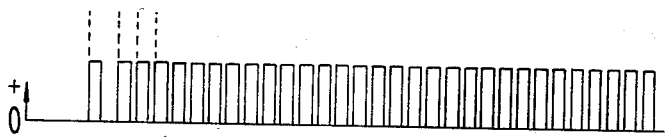
FIG. 10(d).
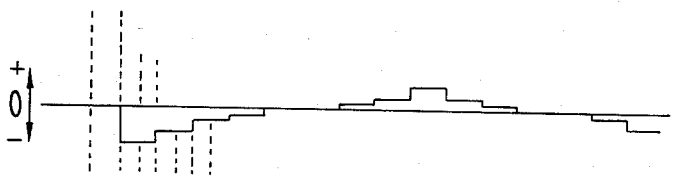
FIG. 10(e).
FIG. 11.
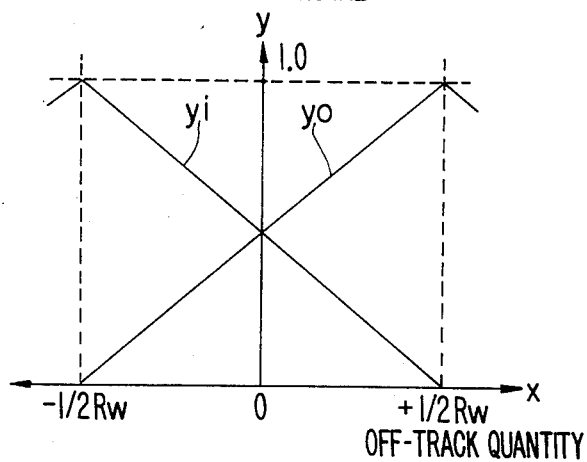

DISK FOR MEASURING OFF-TRACK QUANTITY OF MAGNETIC HEAD, AND MEASURING APPARATUS USING THE DISK

BACKGROUND OF THE INVENTION

1. Field of the Invention

This invention relates to a disk for measuring a head position, which is used for testing or adjusting a displacement or shift quantity, that is, an off-track quantity of, a magnetic head from a desired track in a magnetic disk recording/reproducing apparatus (hereinafter designated as a disk apparatus) employing a magnetic disk, particularly a circular magnetic disk such as a floppy disk, and a measuring apparatus using the disk.

2. Description of the Prior Art

As a method of measuring the off-track quantity of the disk apparatus, an alignment disk designated as a cat's-eye disk (hereinafter denoted by CE disk) has been conventionally employed. FIG. 1 schematically shows the recorded pattern of the CE disk, and two single frequency data of A and B are recorded with O' as a center which is slightly spaced apart from a rotary center O of the disk. When a head H (tunnel erase head) is adapted to reproduce the data A and B at the center O of the disk under such a condition that the off-track is near zero, the waveform of eA=eB shown in FIG. 2(a) is obtained. The output voltage ratio of eA to eB corresponds to the off-track quantity of the head H. However, considerable error is generated in the measurement of the head position according to the conventional CE system. The cause depends upon a reproducing ability of erase gaps ER1 and ER2 of the head H. When data are recorded by a reading/writing (hereinafter denoted by R/W) head, the erase head essentially serves as the erasing function of both sides of the data by passing through DC current. However, in the case of the eccentrically recorded pattern such as CE data, the erase gaps ER1 and ER2 may pick up the magnetic fluxes from the data A and B since an erase core is arranged on the data, and a part of the magnetic flux may leak out to R/W core, resulting in an undesirable influence. FIG. 3 is one example showing a relation between a reproduced output in a usual track and the off-track quantity. The influence due to the reproduction of erase gaps will be clearly seen at portions of P and Q in FIG. 3. That is, the reproduced output approximately linearly decreases with increase of the off-track quantity, but the output does not become zero if the off-track quantity is made equal to the data width, and gradually decreases with a different slope to a point corresponding to the erase core width. The reproducing ability of the erase gap is below a few % against that of R/W gap in general tunnel erase heads. Accordingly, the reproduced output of the head H in FIG. 1 may become the combined output which is obtained from the output of R/W gap R and the output of erase gaps ER1, ER2, so that the output waveform will receive a kind of modulation by the phase difference between them. FIG. 2(b) is an enlarged view of a peak x in the waveform of FIG. 2(a). The phenomenon may be observed in the form of the noise and may be related to the error of the relative ratio of A' to B'.

As another conventional example, an alignment disk of a recorded pattern shown in FIG. 4 has been proposed (referring to Published Unexamined Patent Application No. 52-69309). In the drawing, 1 to 3 is a discrimination mark, and 4 to 9 is burst data which are alternately arranged at outer and inner circumference sides as compared with a track center N. The recorded pattern of the alignment disk is provided with 6 blocks, each of which is comprised of 1 to 9, within one track. FIG. 5 shows the waveforms of 1 to 9 which are reproduced by shifting the head H by x from the track center N in FIG. 4. In the drawing, the relative amplitude ratio eA/eB in 4 and 5, 6 and 7, 8 and 9 corresponds to the off-track quantity x. However, undesirable influence due to the reproducing ability of the erase head appears similarly even in this example, and the peak of respective waveforms is greatly disturbed (portion x in FIG. 5). Accordingly, the lowering of measurement accuracy will not be avoided by this example.

SUMMARY OF THE INVENTION

An object of the present invention is to provide a disk for measuring an off-track quantity of a magnetic head, capable of eliminating a measurement error due to the reproducing ability of an erase gap and capable of obtaining an extremely high measuring accuracy, and a measuring apparatus using the disk, in the case that the magnetic head of the disk apparatus is the tunnel erase type head.

The disk of the present invention provides the features that burst-like data are alternately recorded on the disk over one round of the track in directions of inner and outer circumferences; the data length of the burst-like data is made shorter than a distance between R/W gap of the head reproducing the data and the erase gap; and the distance among data is made longer than a distance between R/W gap and the erase gap. According to the location of the recorded pattern, a chance will be lost that both the R/W gap of the head reproducing the recorded pattern and the erase gap reproduce the data at the same time, and the waveform due to the R/W gap that contributes to the proper reproduction will not be disturbed. Accordingly, the high accuracy measurement of the object can be realized.

Another object of the present invention is to provide an apparatus for measuring the off-track quantity of the magnetic head by using the above disk. According to the apparatus, it will be possible by a desired waveform processing means to measure the off-track quantity and to measure the variation of the central position in one rotation of the disk, that is, the eccentric quantity at the same time. The apparatus also has a function displaying these measured results at a real time.

The apparatus of the invention comprises: AC-DC coverting means to which a discrimination mark and data reproduced by the magnetic head of the apparatus are supplied, reproduced DC signals being obtained from said AC-DC converting means;

A/D converting means for performing and digitizing said DC signals;

Timing detection means for detecting presence of said discrimination mark and data from said reproduced signals and for generating timing signals of data collection;

Amplitude width ratio detection means for performing discrimination of inner and outer circumference sides of said disk in said data and for detecting an amplitude ratio; and Amplitude width ratio vs off-track conversion means for converting said amplitude ratio to an off-track quantity of the reproducing head.

BRIEF DESCRIPTION OF THE DRAWINGS

These and other objects and features of the present invention will be apparent from consideration of the following description of the preferred embodiments together with the accompanying drawings in which:

FIGS. 7(1a) and (1b) show a condition that the reproducing head H is on-tracking, and the reproduced waveform, (2a) and (2b) show a condition that the reproducing head H is off-tracked by about $\frac{1}{4}.R_W$ with respect to the track center N, and the reproduced waveform;

FIGS. 8(a) and (b) show the data length and the distance among data of the recorded pattern against the reproducing head according to the present invention, FIG. 8(c) shows the schematic representation of the reproduced waveform;

FIGS. 10(a) to (e) show output waveforms of respective circuit blocks for explaining the block diagram;

FIG. 11 shows a relation between the off-track quantity x of the reproducing head and an amplitude y of reproduced signal;

DESCRIPTION OF THE PREFERRED EMBODIMENTS

Figure 1:
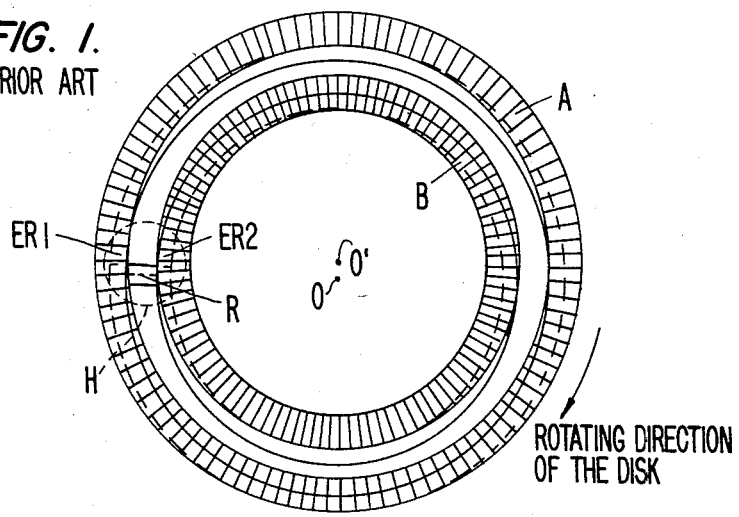
FIG. 1 is the recorded pattern of CE disk according to the conventional example.
Figure 2A:
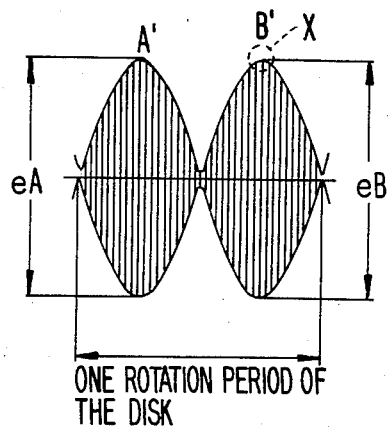
FIG. 2(a) is the reproduced waveform in on-track condition of the reproducing head with respect to the disk shown in FIG. 1.
Figure 2B:
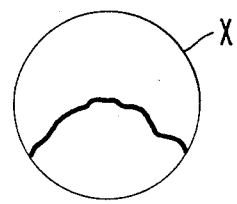
FIG. 2(b) is the enlarged view of the peak x.
Figure 3:
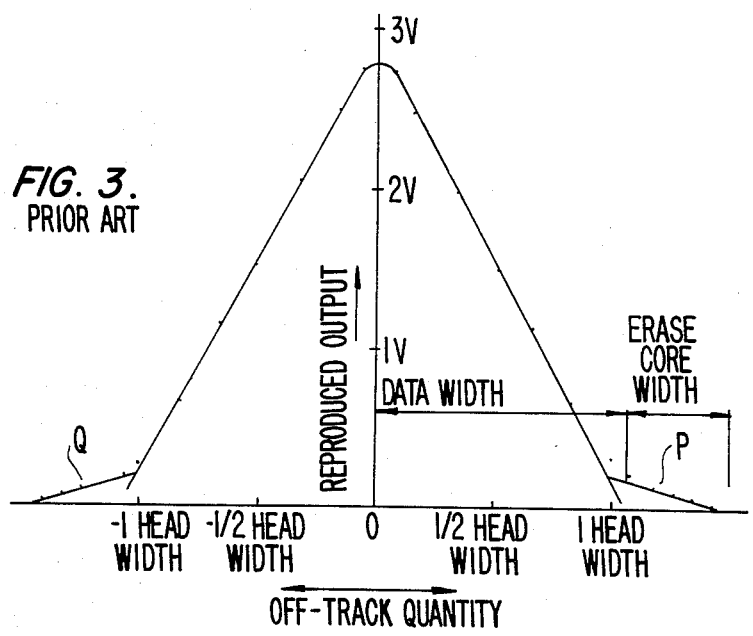
FIG. 3 is the view showing the relation between the reproduced output in the usual track and the off-track quantity of the head.
Figure 4:
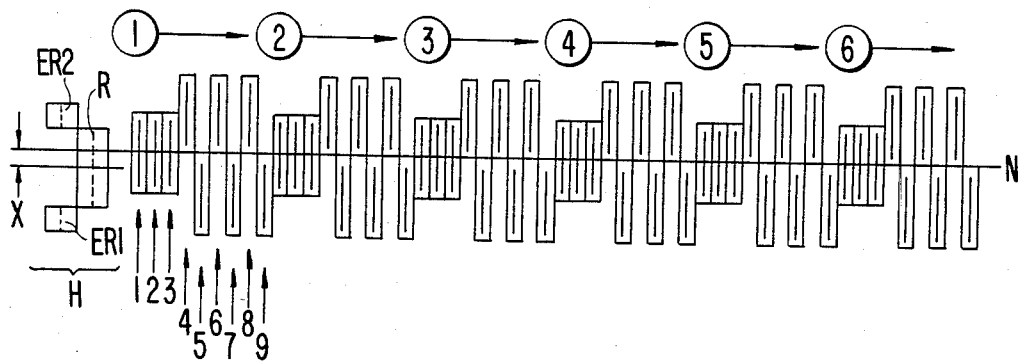
FIG. 4 is the recorded pattern of the alignment disk according to another conventional example.
Figure 5:
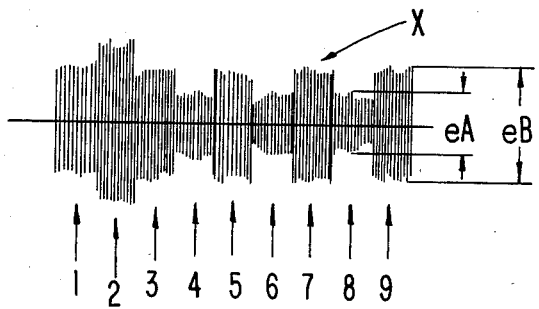
FIG. 5 is the waveform which is reproduced in such a manner that the head is off-tracked or shifted by x against the track center N with respect to the area 1 in FIG. 4.
Figure 6:
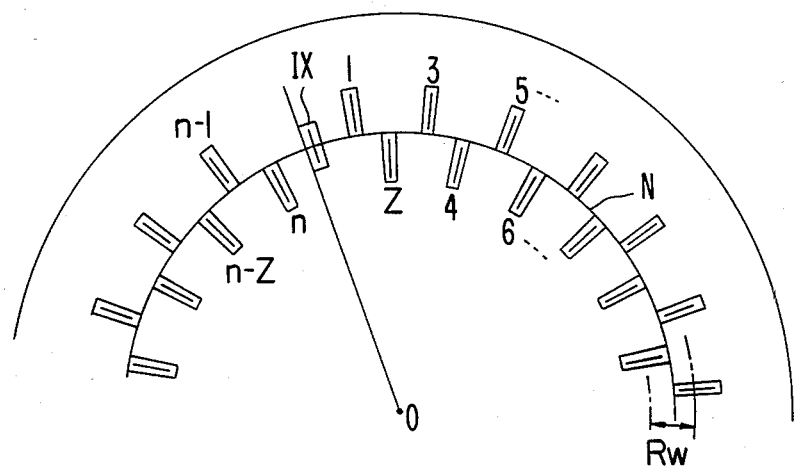
FIG. 6 is a recorded pattern of the alignment disk according to the present invention.

Embodiments of the present invention will now be described with the accompanying drawings. FIG. 6 schematically shows a recorded pattern of a disk according to the present invention. A discrimination mark Ix indicating a cardinal point of the track is first recorded at a desired track position with a point O as a center, and then burst -like data are alternately recorded over one round in inner and outer circumference directions with a track center as a border. $R_W$ in the drawing represents R/W gap width which reproduces the data. FIG. 7(1a) is a schematic representation showing such a condition that a reproducing head H is completely on-tracked, and FIG. 7(1b) is the reproduced waveform. Further, FIG. 7(2a) is a representation showing such a condition that the reproducing head H is off-tracked by about ¼ head width in the direction of inner circumference of the disk and FIG. 7(2b) is the reproduced waveform. Data numbers 1, 2 and 3, 4,—make pairs, respectively. The relative amplitude ratio eA/eB corresponds to the off-track quantity. Further, since a plurality of data pairs exist on the track over one round, it is possible to measure the off-track quantity at each point according to the numbers of the data pairs, that is, to measure the eccentric quantity. The numbers of the data pairs in the embodiment are defined by 48 pairs, depending upon a relation of erase crosstalk described later. The discrimination mark Ix is a timing mark for discriminating the data pairs, and is useful in a measuring apparatus described later. Further, the frequency of Ix mark is 2 times as high as a reference writing frequency, and is the same as a data frequency.

The explanation described above is the principle for measuring the off-track quantity according to the present invention. A principle of highly accurate measurement, which is the greatest object of the present invention, will then be described.

As described above, the primary factor for the measurement error according to conventional examples is the reproducing ability of the erase gap, and the erase gap interferes with the output reproduced by the proper R/W gap (this means the erase crosstalk), thereby lowering the measuring accuracy. Consequently, the problem will be solved if the data are not present at all at the portion of the erase gap during a period of reproducing the data by the R/W gap.

FIG. 8 shows both the data length of respective burst-like data in the present invention and its data space in comparison with the size of the reproducing head. LRE in the drawing represents the distance between the R/W gap R and the erase gaps ER1, ER2. LD1 indicates the data length, and LD2 represents the data space or the distance among data. A relation given by $LD1 \leq LRE \leq LD2$ is valid. That is, the data are not applied to the R/W gap and the erase gaps at the same time even in either case of FIG. 6(a) or (b). Accordingly, eER of the drawing (c) reproduced by the erase gaps appears on portions except normal data 1, 2, 3,—as a microlevel, so that the interfere does not occur at all. With respect to the recording time of respective concrete data, LD1 and LD2 are given by 0.921 ms and 1.036 ms, respectively, in the case where LRE and the rotating period of time are rendered by 850 μm±50 μm and 200 ms, respectively, in the track (radius: 27.674 mm). Since the subject of the track to be measured often extends to 00~39 in the practical embodiments, LD1 and LD2 are given by about 0.75 ms and 1.30 ms, respectively. Accordingly, whole data pairs in one round of the track becomes 48 pairs because of 200 ms/2×(0.75 ms+1.30 ms).

As is evident from the explanation described above, the disk according to the present invention will not be affected at all by the erase crosstalk even if the head is formed of the tunnel erase type, and it can be possible to systematically measure the eccentric quantity because a plurality of data pairs exist in one round of the track. Further, the highly accurate measurement can be realized by obtaining the average value of whole data pairs.

Next, the measuring apparatus for measuring the practical off-track quantity of the disk apparatus by using the disk will be described depending upon one embodiment.

Figure 9:
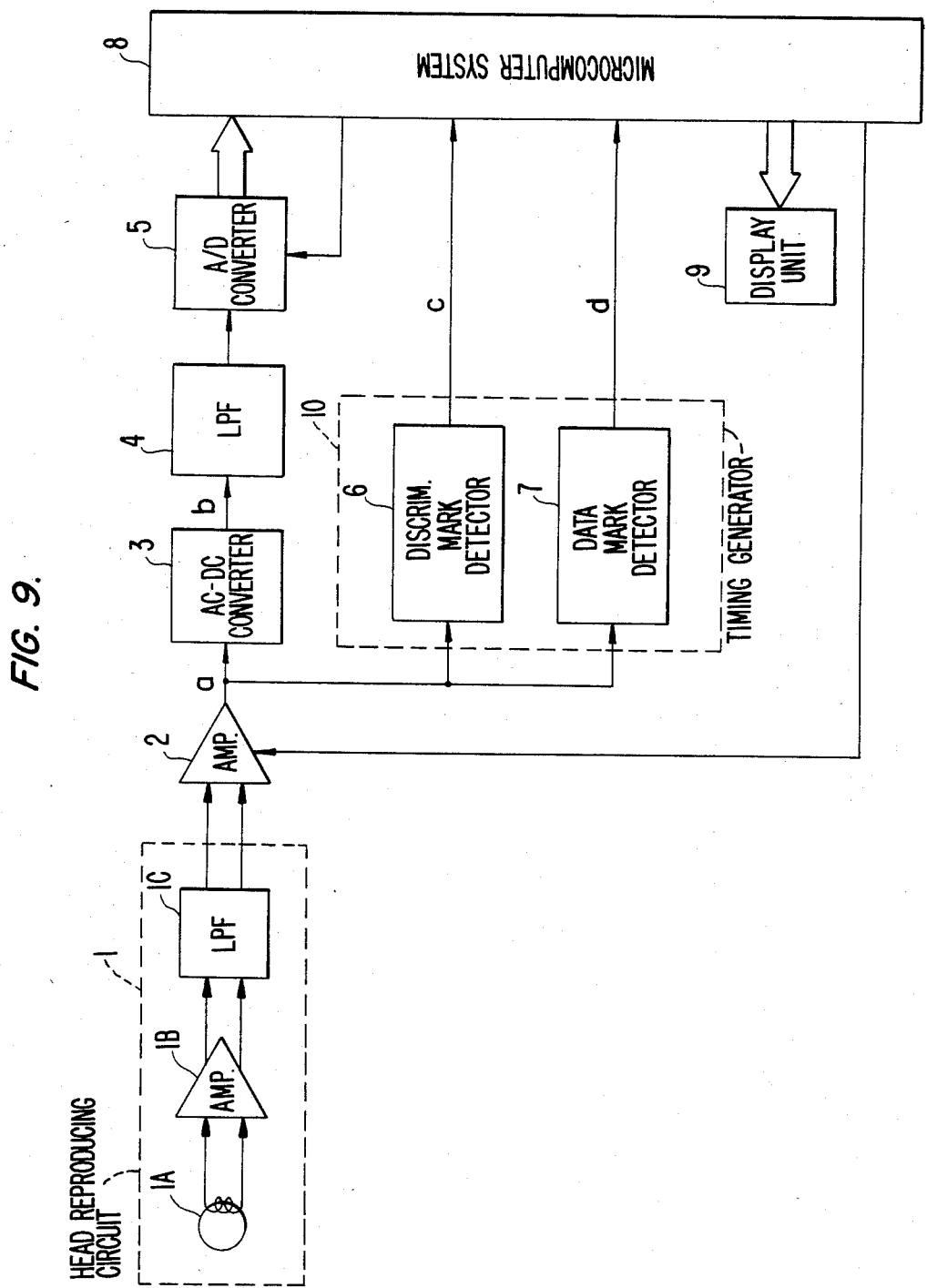
FIG. 9 is a block diagram of the measuring apparatus for measuring the off-track quantity of the reproducing head in the disk apparatus by using a disk according to the present invention.

FIG. 9 is a block diagram of the embodiment which is constituted in such a manner that the off-track quantity and the eccentric quantity of the reproducing head are displayed as the final output by electrically processing the reproduced signals from the disk apparatus. In the drawing, 1 is a head reproducing circuit system of the disk apparatus, which comprises a head 1A, an amplifier 1B, and a low-pass filter 1C; 2 is an amplifier for amplifying the output signals of the disk apparatus to a desired level; 3 is an AC-DC converter for converting AC reproduced signals to DC signals; 4 is a low-pass filter for removing unwanted high frequency components; and 5 is an A/D converter for converting analog signals to digital signals. Further, 10 is a timing generator which detects both the discrimination mark recorded on the disk and the data marks and which comprises a discrimination mark detector 6 for feeding respective timing signals and a data mark detector 7, 8 is a microcomputer system for obtaining the off-track quantity and the eccentric quantity by computing the data from the A/D converter. 9 is a display unit of the measured results.

FIG. 10 shows a waveform every each block in FIG. 9 in the case where the eccentricity is recognized in the disk apparatus. In the drawing, (a) is the output of the amplifier 2, (b) is the output of the AC-DC converter circuit 3, (c) is the output of the discrimination mark detector 6, (d) is the output of the data mark detector, and (e) is the off-track quantity of the reproducing head due to the relative amplitude ratio of respective data mark pairs. On the operation of the measuring apparatus thus constituted, the reproduced signals from the head reproduction circuit system 1 of the disk apparatus is first applied to the amplifier 2. The gain of the amplifier 2 is controlled so that the signal level during A/D conversion is properly processed. Accordingly, the amplifier 2 is provided with a variable gain function. The waveform of the amplifier 2 in the case that the disk apparatus has the eccentricity becomes the different amplitude in inner and outer circumference data according to the off-track quantity during one rotation of disk, as shown in FIG. 10(a). Although the AC-DC converter circuit 3 is one kind of an envelope detector, a high speed response accurately following the waveform peak value of each data mark is required for the AC-DC converter circuit. According to the embodiment, the high speed response is obtained by combining a high peak hold circuit, its rest circuit, and a high speed sampling circuit (these being not illustrated), and properly controlling these timings (referring to Japanese Patent Application No. 57-214441). FIG. 10(b) shows this output waveform. The low-pass filter 4 is provided so as to remove unwanted high frequency components contained in the reproduced DC signals.

The discrimination mark detector 6 and the data mark detector 7 are adapted to produce the timing signals for converting the AC-DC converted signals shown in FIG. 10(b) to the digital signals with a desired timing through the A/D converter 5 and supplying the digital signals to the microcomputer 8. The discrimination mark detector 6 responds to only the discrimination mark Ix shown in FIG. 6, thereby generating a pulse signal as shown in FIG. 10(c). In the embodiment, since the discrimination mark and the data marks whose frequencies are different to each other are employed, the object is achieved by the frequency discrimination system. Further, the data mark detector 7 responds to all of data marks including the discrimination mark, thereby generating pulse signals as shown in FIG. 10(d). Consequently, if the data is supplied to the microcomputer 8 by actuating the A/D converter every detecting the data mark detection signals (d) after recognition of the discrimination mark detection signal (c), data marks of inner circumference side and data marks of outer circumference side will be alternately obtained in the form of digital signals.

FIG. 11 shows the relation between the off-track quantity x of the reproducing head and the amplitude y of reproduced signal, wherein yi and yo illustrate the signal amplitude in the inner circumference direction of track and the outer circumference direction of track, respectively. $R_W$ is the $R_W$ gap width of the reproducing head. With respect to the direction of the off-track, the outer circumference side and the inner circumference side are indicated by $\oplus$ direction and $\ominus$ direction, respectively. In the drawing, yi and yo are expressed by $$yi = -(x/R_W) + \tfrac{1}{2} (-\tfrac{1}{2} \cdot R_W \leq x \leq \tfrac{1}{2} \cdot R_W) \qquad (1)$$

$$yo = x/R_W + \tfrac{1}{2} (-\tfrac{1}{2} \cdot R_W \leq x \leq \tfrac{1}{2} \cdot R_W) \qquad (2)$$

Therefore, the amplitude ratio yi/yo is given by $$yi/yo = (-2 \, xW/R_W + 1)/(2 \, x/R_W + 1)$$
$$(-\tfrac{1}{2} R_W \leq x \leq \tfrac{1}{2} R_w) \qquad (3)$$

The off-track quantity x is rendered from (3) by $$x = \tfrac{1}{2} \cdot [1 - (yi/yo)]/[1 + (yi/yo)] \cdot R_W \qquad (4)$$
$$= [(yo - yi)/(yo + yi)] \cdot R_W/2$$

Since the off-track quantity x is the function of the reproduced signal amplitude ratio and the $R_W$ gap of the reproducing head from the formula (4), it can be obtained by processing the signals (not shown) corresponding to the $R_W$ gap width and the amplitude ratio of reproduced signals by means of the microcomputer. In the embodiment, a conversion table of the amplitude ratio and the off-track quantity is made from the $R_W$ gap width entered from the outside by using the formula (4) and is employed. Further, since the off-track quantity is obtained from respective data pairs in one round of the tracks, the eccentric quantity can be provided by calculating the maximum and minimum values after one rotation of the disk.

Figure 12:
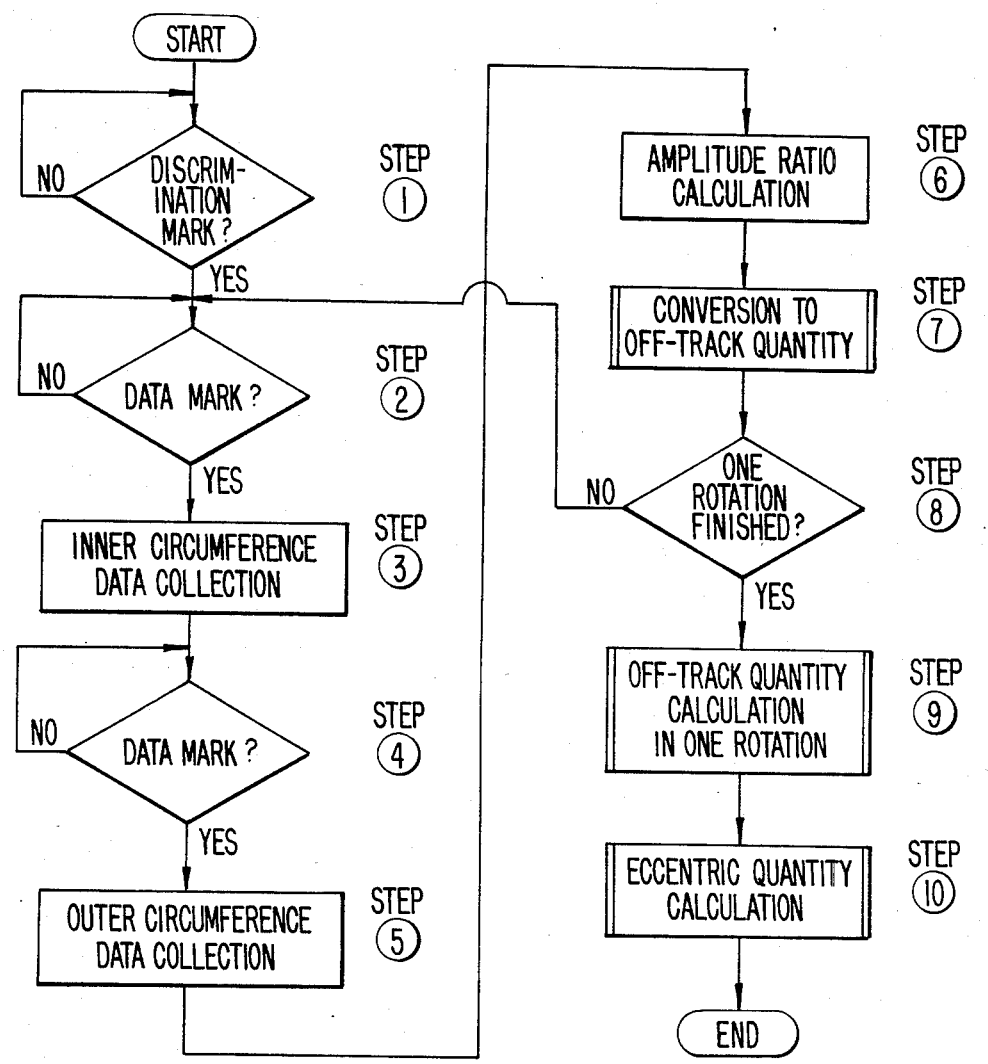
FIG. 12 is a flowchart for explaining an operation of a microcomputer, shown by a numeral 8 in FIG. 9, in the form of software.

The operation of the microcomputer 8, that is, the software shown in FIG. 9 will be somewhat described in detail. In the flowchart shown in FIG. 12, after the discrimination mark Ix is detected by the discrimination mark detector at a step 1 , the data marks are detected by the data mark detector at a step 2 The microcomputer then instructs the start of conversion to the A/D converter at a step 3 after a desired period of delay time, thereby collecting the data. In this case, when the data marks recorded on the disk are present at the inner circumference side, the collected data are also regarded as the inner circumference side. Although the following data are then collected at steps 4 and 5 in the same manner as described above, the data are the data of the outer circumference side. Therefore, a pair of data marks are obtained. The amplitude ratio is obtained at a step 6 and the off-track quantity is calculated at a step 7 by using the formula (4) and is stored. As the numbers of data marks recorded on the disk are previously determined, the completion of the measurement about one rotation of the disk can be decided by checking the numbers of measured data marks at a step 8 . The steps 6 to 8 are carried out within an extremely short time, and the detection of the following data marks will not be mistaken. Next, when all measurements are not finished, the procedure is returned to the step 2 Further, in the case of the completion, the off-track quantity at each point that has been stored is calculated at a step 9 with respect to one rotation of the disk, thereby obtaining the average value. Maximum and minimum values are calculated at a step 10 to obtain the eccentric quantity. The operation described above is renovated every one rotation of the disk, so that the measured results will be usually displayed at a real time.

Next, the AC-DC converter 3 and the timing generator 10 in FIG. 9 will be more detailedly described with reference to FIGS. 13 and 14, respectively.

Figure 13:
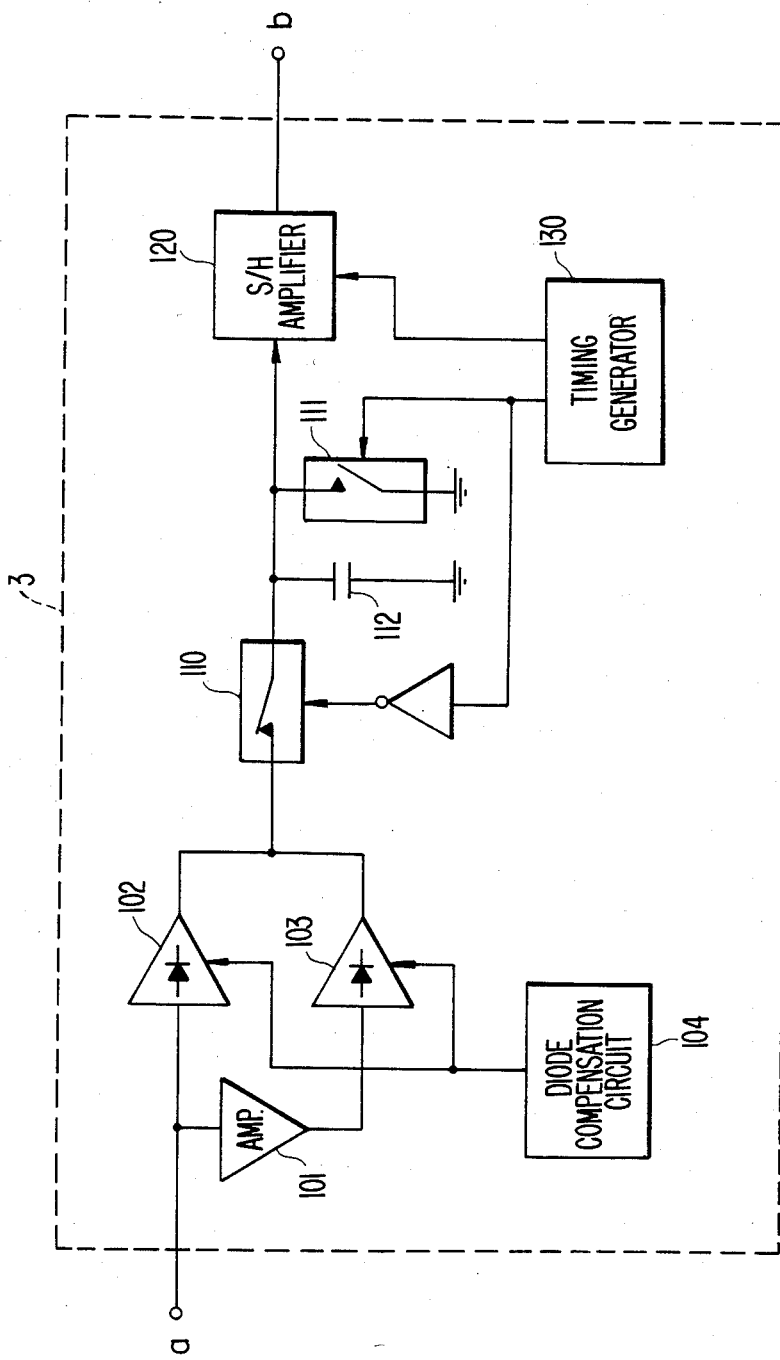
FIG. 13 is a detailed block diagram of an embodiment of the AC-DC converter (3) in FIG. 9.

FIG. 13 shows a block diagram of an embodiment of the AD-DC converter 3. Referring to FIG. 13, 101 is an inverting amplifier, 102 and 103 are one-directional detection amplifiers, 104 is a diode-characteristic compensation circuit for compensating the forward voltage drop and the temperature characteristic of a diode used in each of the detection amplifiers 102 and 103, 110 and 111 are analog switches, 112 is a capacitor for holding the peak value of the analog signal, 120 is a sampling-and-holding amplifier for sampling the signal held by the capacitor 112 and holding it for a predetermined period, and 130 is a timing generator for controlling the switching timing of the analog switches 110 and 111 and the sampling-and-holding amplifier 120.

The amplifiers 101, 102 and 103 constitute a full wave rectifier circuit, which converts the input AC signals (62.5 kHz and 125 kHz signals) into a DC signal (pulsating signal). The analog switches 110 and 111 operate oppositely to each other. During a peak-hold timing, the switch 110 is ON and the switch 111 is OFF. During this timing, the capacitor 112 charges to the peak value of the DC signal, and the sampling-and-holding amplifier 120 samples the peak value. The next timing is the reset timing in which the switch 110 is OFF and the switch 111 is ON so that the capacitor 112 discharges the holded energy in a moment. The above described cycle of peak-hold→sample-and-hold→reset is repeated at the interval longer than the $\frac{1}{2}$ wavelength of the input signal, thereby achieving the envelope detection which is adequately responsible to the ripid rising and dropping of the signal level of the input signal.

Figure 14:
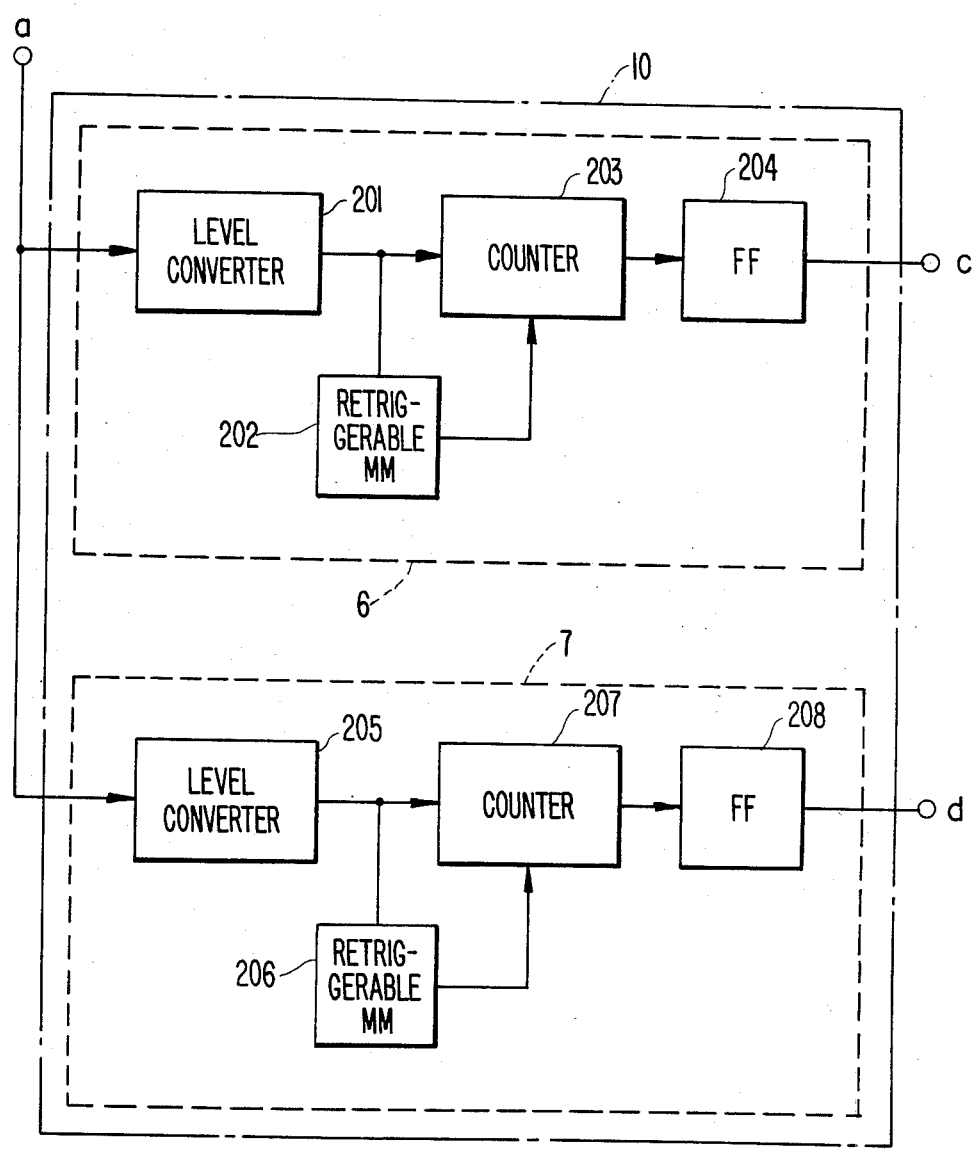
FIG. 14 is a detailed block diagram of an embodiment of the timing generator (10) in FIG. 9.

FIG. 14 shows a detailed block diagram of an embodiment of the timing generator 10 which includes the discrimination mark detector 6 and the data mark detector 7. The circuit configurations of the both mark detectors 6 and 7 are the same. They are different only in circuit constant. Referring to FIG. 14, 201 is a level converter for detecting a signal higher than a predetermined level and converting the level of the detected signal to a TTL logic level (0~ +5 V), 202 is a retriggerable monostable multivibrator (MM, hereafter) which is responsive only to a signal having a frequency higher than a predetermined frequency, 203 is a counter for counting the output signals of the level converter 201 according to the clock pulses outputted from the MM 202, and 204 is a flip-flop triggered by the output signal of the counter 203.

Providing that the predetermined frequency of the MM 202 is 100 kHz and the counter 203 is a hexadecimal counter, when a signal having the frequency of 125 kHz is inputted the MM 202 operates to allow the counter 203 active. The counter will trigger the flip-flop 204 after counting sixteen pulses. On the other hand, when a signal having a frequency (e.g. 62.5 kHz) lower than 100 kHz is inputted the MM 202 stops its operation so that no signal is outputted from the discrimination mark detector 6. In other words, the discrimination mark detector 6 outputs a signal only when it is applied with an input signal having a frequency higher than the predetermined frequency.

In the same way, the data mark detector 7 comprises a level converter 205, a retriggerable MM 206, a counter 207, and a flip-flop 208. The circuit constant of the MM 206 is different from that of the MM 202. The operation of the data mark detector 7 is the same as that of the discrimination mark detector 6 described above.

The mark detectors 6 and 7, each of which can be regarded as a kind of digital filters, are responsive only to continuous signal inputs of a limited frequency range, so that they assure highly reliable operations against noises.

In the embodiment, although the discrimination mark recorded on the disk was employed for the timing detection of starting the measurement, it can be possible to use an index signal, for example, of the disk apparatus that performs the similar function to that of the discrimination mark.

Further, it can be possible to realize the similar function to that of the embodiment in the form of the entire hardware without using the microcomputer. And it will be apparent that the structure of the apparatus is not limited to the above described embodiments, but the present invention can be modified in various manners without departing from the scope of the invention.

According to the disk and the measuring apparatus of the invention, the measurement accuracy of $\pm 2$ $\mu$m can be realized in the range of the off-track of $-\frac{1}{2} \cdot R_W$ to $+\frac{1}{2} \cdot R_W$.

What is claimed is:

1. A disk for measuring an off-track quantity of a magnetic head having burst-like data alternately recorded on said disk over one round of tracks in directions of inner and outer circumferences with the track center of a desired track as a border, said burst-like data being recorded in such a manner that each data length is shorter than a distance between an R/W gap of a magnetic head for reproducing said data and an erase gap, and that a distance between said data is longer than said distance between said R/W and said erase gap.

2. A disk for measuring an off-track quantity of a magnetic head according to claim 1, wherein a discrimination mark indicating a cardinal point of said data in said desired track during one rotation of said disk is recorded on said disk.

3. An apparatus for measuring an off-track quantity of a magnetic head by using a disk having burst-like data alternately recorded on said disk over one round of tracks in directions of inner and outer circumferences with the track center of a desired track as a border, said burst-like data being recorded in such a manner that each data length is shorter than a distance between an R/W gap of a magnetic head for reproducing said data and an erase gap, and that a distance between said data is longer than said distance between said R/W gap and said erase gap, wherein a discrimination mark indicating a cardinal point of said data in said desired track during one rotation of said disk is recorded on said disk, said apparatus comprising:

a AC-DC converting means having a discrimination mark and data reproduced by the magnetic head of the apparatus supplied thereto for reproduced DC signals corresponding thereto;

an A/D converting means for digitizing said reproduced DC signals;

a timing detection means for detecting the presence of said discrimination mark and data from said reproduced signals and for generating data collection timing signals corresponding thereto;

an amplitude width ratio detection means for performing discrimination of inner and outer circumference sides of said disk in said data and for detecting an amplitude ratio; and an amplitude width ratio vs off-track conversion means for converting said amplitude ratio to an off-track quantity of the magnetic head.

4. An apparatus according to claim 3, wherein said amplitude ratio vs off-track quantity conversion means is constituted so that signals corresponding to R/W gap width of said head to be measured are externally extered therein.

* * * * *